UNITED STATES PATENT OFFICE.

ERNST STÖFFLER, OF ZURICH, SWITZERLAND.

FIREPROOF QUARTZ BRICK OR BLOCK.

No. 805,242.    Specification of Letters Patent.    Patented Nov. 21, 1905.

Application filed May 11, 1904. Serial No. 207,479.

*To all whom it may concern:*

Be it known that I, ERNST STÖFFLER, residing at 72 Forchstrasse, Zurich, Switzerland, have invented new and useful Improvements in Fireproof Quartz Bricks or Blocks; and I do hereby declare that the following is a full, clear, and exact description of the invention, which will enable others skilled in the art to which it appertains to make and use the same.

Experiments in connection with the manufacture of artificial stone from sand or quartz and dolomite have shown that pure magnesia in certain circumstances can serve as the binding material in a similar manner to that already made known in connection with the employment of lime and sand. Furthermore, the use of magnesia in lieu of lime has the advantage that when the magnesia mixture is slaked the magnesia possesses less inclination to form concretions than the lime mixture, which is of considerable weight in the manufacture of homogeneous mixtures, since for the manufacture of good bricks or blocks it is essential to completely slake all the lime or magnesia particles.

Even although it could not be shown that magnesia bricks or blocks possess higher fire-resisting properties than lime bricks or blocks, yet with equal contents of lime or magnesia it has been proved that lime and sand bricks or blocks expand much more under heat than magnesia and sand bricks or blocks. Bricks containing seven per cent. of lime or magnesia expand in the case of lime to an extent of four per cent., and in the case of magnesia to an extent of only two per cent.

In mixtures rich in lime or magnesia and wherein it is rather a question of a high degree of hardness or strength than of high fire-resisting properties it has been shown that sand bricks made with magnesia are more difficult to melt than bricks made with the same quantity of lime. For example, if the lime-sand brick melts at about Seger cone 10 (1,330° centigrade) bricks made with the same quantity of magnesia in place of the lime show a melting-point at Seger cone 15, (1,430° centigrade.) All experiments indicate that bricks made with magnesia instead of lime possess properties differing considerably from those of lime-sand bricks. Furthermore, while on burning Dinas bricks made with an addition of lime and not steam-hardened an active reaction is observed between the silicic acid and the lime and a consequent considerable hardening, (rigidity.) This does not take place to the same extent when magnesia is employed as the binding material in the manufacture of such bricks. Experiments in burning artificial sand bricks containing magnesia as the binding material in cases where the burning was not preceded by steam-hardening did not result in the production of sufficiently strong bricks, probably because the binding material—namely, magnesia—did not come fully into action. The action of the magnesia is, however, quite different when the magnesia-sand bricks before burning are hardened in steam vessels under steam-pressure. The hardness attained on burning is then sufficient, as is shown by the above-mentioned experiments. After burning they are in many respects better than Dinas bricks made with lime. From the different qualities possessed by hardened and unhardened magnesia-sand bricks it would seem that the mixture of magnesia and quartz undergoes alteration on hardening under steam-pressure, this alteration securing the result that on burning, strong magnesia-sand bricks are obtained. All quartz materials do not show equally favorable results with this method of treatment, those materials which expand considerably on burning being least suitable. From these materials, however, strong fireproof bricks can be obtained when the quartz rock or sand is subjected to a heating process and then chilled with cold water before being pulverized and molded. The quartz so baked produces with magnesia as the binding material a good fireproof brick. While Dinas bricks made with lime show a considerable tendency to bend or warp at high temperatures, this tendency in the case of magnesia and sand bricks manufactured in accordance with my process at high temperatures, such as 16 Seger cone (1,450° centigrade) and 17 Seger cone, (1,470° centigrade,) is so small that it can be looked upon for practical purposes as non-existent.

Having now particularly described and ascertained the nature of my said invention and in what manner the same is to be performed, I declare that what I claim is—

The herein-described process of making fireproof brick, which consists in mixing sand or its equivalent with magnesia alone as a binding material, molding the bricks, then hardening them with steam and then burning the hardened bricks.

ERNST STÖFFLER. [L. S.]

Witnesses:
 ALBERTO BOLLIGER,
 JOSEPH ABBONDIO.